United States Patent [19]

Simcoe

[11] Patent Number: 5,072,366
[45] Date of Patent: Dec. 10, 1991

[54] DATA CROSSBAR SWITCH

[75] Inventor: Robert J. Simcoe, Westborough, Mass.

[73] Assignee: Digital Equipment Corporation, Maynard, Mass.

[21] Appl. No.: 81,346

[22] Filed: Aug. 4, 1987

[51] Int. Cl.⁵ .............................................. G06F 1/00
[52] U.S. Cl. ................................. 395/200; 340/825.89
[58] Field of Search ... 364/200 MS File, 900 MS File; 340/825.79, 825.85, 825.89, 825.8, 825.83; 370/42, 53; 379/269, 272, 291

[56] References Cited

U.S. PATENT DOCUMENTS

| | | | |
|---|---|---|---|
| 3,226,688 | 12/1965 | Amdahl et al. | 364/200 |
| 3,226,692 | 12/1965 | Fuller et al. | 364/200 |
| 3,274,554 | 9/1966 | Hopper et al. | 364/200 |
| 3,581,286 | 5/1971 | Beausoleil | 364/200 |
| 3,634,830 | 1/1972 | Baskin | 364/200 |
| 3,729,711 | 4/1973 | Foster et al. | 364/200 |
| 3,805,245 | 4/1974 | Brooks et al. | 364/200 |
| 3,916,380 | 10/1975 | Fletcher et al. | 364/200 |
| 3,944,956 | 3/1976 | Misulovin et al. | 340/825.79 |
| 3,976,845 | 8/1976 | Ashley | 340/825.8 |
| 4,075,693 | 2/1978 | Fox et al. | 364/200 |
| 4,195,344 | 3/1980 | Yamazaki | 364/200 |
| 4,331,956 | 5/1982 | Anderson | 370/67 |
| 4,365,292 | 12/1982 | Barnes et al. | 364/200 |
| 4,417,245 | 11/1983 | Melas et al. | 340/825.8 |
| 4,438,494 | 3/1984 | Budde et al. | 364/200 |
| 4,523,273 | 6/1985 | Adams, III et al. | 364/200 |
| 4,539,564 | 9/1985 | Smithson | 340/825.79 |
| 4,580,011 | 4/1986 | Glaser | 379/291 |
| 4,600,813 | 7/1986 | Pilling | 340/825.85 |
| 4,610,011 | 9/1986 | Drayyer | 340/825.8 |
| 4,630,045 | 1/1986 | Georgiou | 340/825.79 |
| 4,644,461 | 2/1987 | Jennings | 364/200 |
| 4,764,893 | 8/1988 | Karabatsos | 364/900 |
| 4,821,258 | 4/1989 | Fraser | 340/825.89 |
| 4,839,643 | 6/1989 | Koenig et al. | 340/825.89 |

*Primary Examiner*—Stuart N. Hecker
*Assistant Examiner*—Rebecca L. Rudolph
*Attorney, Agent, or Firm*—Cesari & McKenna

[57] ABSTRACT

A crossbar switch consists of a control computer, and a switching matrix which includes a number of switching cells in which connections between data input lines and data output lines are made. The switch operates to simultaneously connect to data output lines initially active data input lines and disconnect therefrom inactive data input lines. Each data input line is associated with an activity logic circuit which monitors activity on the line. The activity logic circuits connect to the control computer and inform it when an inactive data input line becomes active and requires a connection. The activity logic circuits further inform the control computer of the status of connected data input lines each time the control computer performs a connection operation. To make a connection, the control computer energizes a column enable line corresponding to the requested data output line and leaves de-energized the column enable lines corresponding to the other data output lines. It similarly energizes the row enable line corresponding to the initially active data input line. Coincidence of energized row enable and column enable lines at a switching cell causes it to latch into a state in which it connects its input line to its output line. The coincidence of an energized column enable line and a de-energized row enable line at a switching cell causes it to latch into a state in which previous connections are severed.

37 Claims, 3 Drawing Sheets

DATA CROSSBAR SWITCH

FIELD OF THE INVENTION

The invention relates generally to the field of information transfer mechanisms for a digital computer system and more specifically to digital data crossbar switches for use in digital computer applications.

PRIOR ART

Crossbar switches interconnect various input lines to various output lines through switching elements, or cells, arranged in an array or matrix. The number of switching cells in the crossbar switch is equal to the number of input lines multiplied by the number of output lines.

Small crossbar switches, for example, those having sixteen switching cells, arranged as a 4×4 switching array, which is required to connect four input lines to four output lines, can be made with a fairly simple control mechanism. The control mechanism can include, for example, a sixteen bit register to keep track of the state of each of the sixteen switching cells and a simple device to energize or de-energize any of the switching cells to thereby connect or disconnect any of the four input lines to any of the four output lines. The control mechanism must also ensure that only one input line is connected to any one output line.

Larger crossbar switches have been designed to interconnect hundreds of input lines and hundreds of output lines. Such switches contain thousands of switching cells. A large switch requires a sophisticated control computer to selectively operate the energizing and de-energizing of the thousands of individual switching cells, to ensure that only one of the input lines is connected to any output line, and to keep an updated record of the state of each of the thousands of switching cells. As the size of the switch matrix is increased, for example, to thousands of input lines and thousands of output lines, the complexity of the monitoring and control function which must be managed by the control computer is significantly increased. The control computer must be able to control millions of switching cells and thus must be quite sophisticated.

Crossbar switches for use in data processing systems, for example, in interfacing a number of user terminals or processors with a number of other processors in a computer system, can be easily and inexpensively constructed using integrated circuit technology. The problem with using a crossbar switch in a digital computer system is that the switch typically would have to be fairly large. Thus, the control computer which controls the switching cell matrix must be quite complex to enable it to monitor the status of each of the switching cells and control the energizing and de-energizing of the cells. In a typical computer system, the switching matrix would require tens of thousands of switching cells. This means that while the actual switches can be made inexpensively, using integrated circuit technology, the control computers associated with the switches will be expensive.

SUMMARY OF INVENTION

The invention provides a new and improved crossbar switch, including a simplified control mechanism, for transferring data between elements such as user terminals and processors in a data processing system. In a switch constructed in accordance with the invention, the crossbar switch control functions, which in the past have been handled exclusively by a fairly sophisticated control computer, are divided between the switch and a much less sophisticated control computer. Thus the cost of the crossbar switch, including the control computer, is greatly reduced over prior crossbar switches.

In brief summary, the new crossbar switch includes one or more switching chips, each interconnecting a plurality of data input lines and data output lines through a plurality of switching cells. The switching chips can be interconnected into an array of switching chips to form larger crossbar switches. When an input line becomes active, that is, when data initially comes in on the line, activity logic on the switching chips connected to the input line signals the switch control computer. The switch control computer, which is connected to each switching chip, then polls the data input lines and selectively energizes a switching cell on the active data input line to connect the line to a data output line identified by signals on the input line. Once the connection is made, the activity logic on the switching chip monitors the activity on the data input line each time the data input line is polled and signals the control computer that a particular line has become inactive, that is, that data is no longer being transferred on the line. The control computer can then set a timer for the inactive line and, if the control computer is not thereafter notified by the associated activity logic that the data input line has become active within a prescribed period of time, the control computer can de-energize the switching cells connected to the line. Thus the control computer, which can be an unsophisticated microprocessor, is used only to supervise the selective energizing and de-energizing of switching cells. The control computer does not monitor the activity of the individual switching cells, nor is it required to continuously test inactive lines for activity.

BRIEF DESCRIPTION OF THE DRAWINGS

The invention will be pointed out with particularity in the appended claims. The above and other advantages of the invention may be better understood by referring to the following description taken in conjunction with the accompanying drawings, in which:

DETAILED DESCRIPTION

Figure 1:
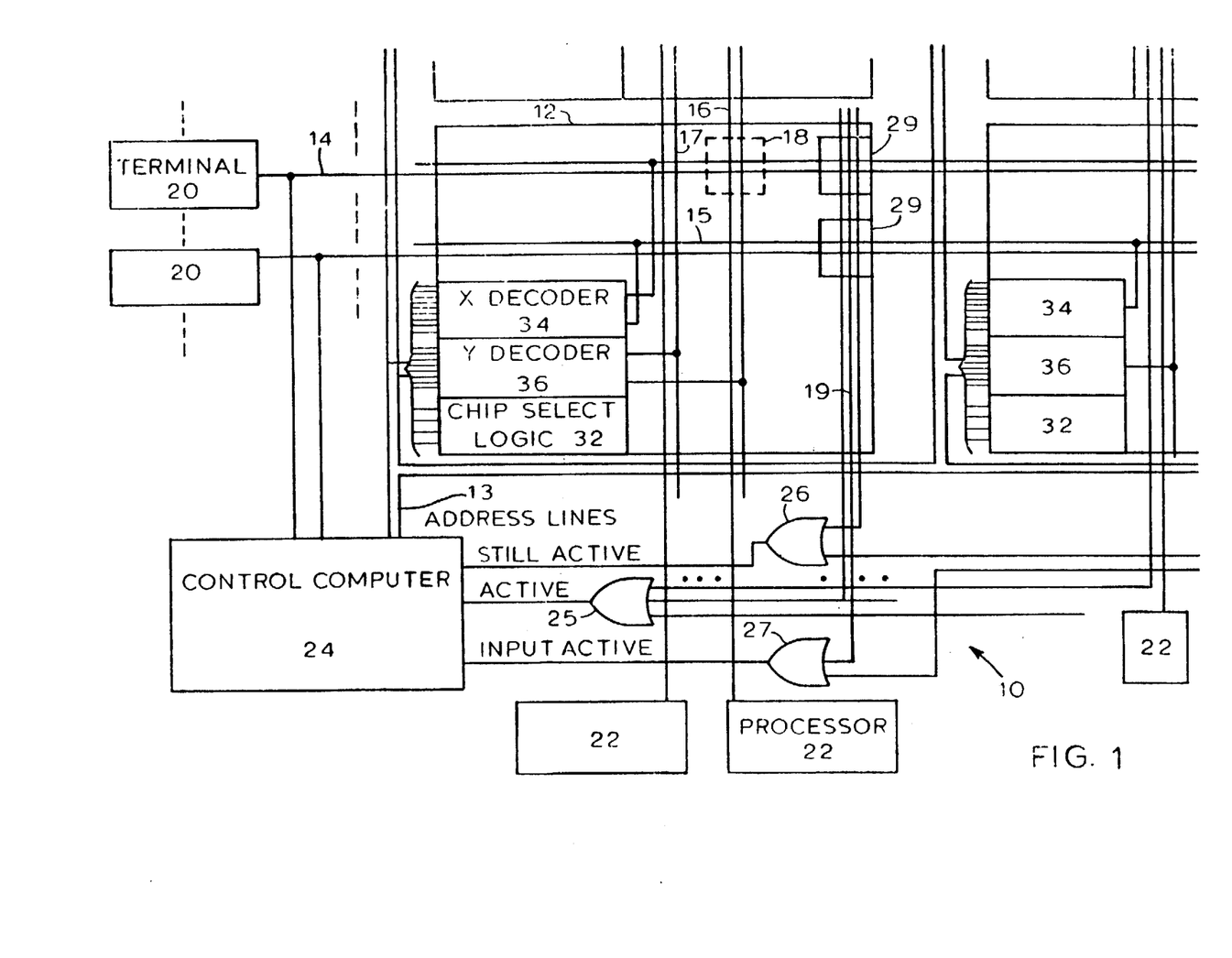
FIG. 1 is a functional block diagram of a system including a switching array constructed in accordance with the invention.

Referring to FIG. 1, a system constructed in accordance with the invention includes a plurality of terminals 20 and processors 22 interconnected by a crossbar switching array 10 comprising one or more switching chips 12 controlled by a control computer 24. If array 10 comprises more than one switching chip 12, the switching chips may be arranged in a matrix configuration comprising a plurality of rows and columns. Each switching chip 12 can be identified by its row and column location within the crossbar switching array 10.

Each switching chip 12 includes a plurality of switching cells 18, each of which selectively connects a data input line 14 (running in the horizontal direction as shown in FIG. 1) to a data output line 16 (running in the vertical direction as shown in FIG. 1). Within each switching chip 12, the switching cells 18 are also arranged in rows and columns. Each data input line 14 is connected to all switching cells 18 in a particular row of cells 18 in all chips 12 in the same row in the array 10. Similarly, each data output line 16 is connected to all switching cells 18 in a particular column of cells 18 in all chips 12 in the same column in the array 10.

The switching chip 12 operates in response to address signals on address lines 13 to energize a selected one of a plurality of row enable lines 15 and one of a plurality of column enable lines 17. The energized row enable line 15 and column enable line 17 energize a switching cell 18 to interconnect a data input line 14 and a data output line 16. The address lines 13 are connected to all of the switching chips 12 in parallel. Each of the switching cells 18 in the switching chip 12, which are described in detail below in reference to FIG. 2, can be identified by its row and column within the switching chip 12.

Each switching chip 12 also includes a plurality of activity lines 19 which indicate activity on the various data input lines. More specifically, each data input line 14 is connected to activity logic 29, which is connected to three switching chip activity lines generally identified by reference numeral 19 (described in more detail below in connection with FIG. 3). In addition, if the array 10 comprises a plurality of switching chips 12, each of the three switching chip activity lines 19 is OR'd through OR gates 25-27 with the corresponding line from all the other switching chips 12. The three output signals from the OR gates 25-27 are used, as described below, by the control computer 24 to identify the status of the input lines 14, that is, to indicate the presence of input data provided by terminals 20 on the respective lines 14.

In the illustrative system, the data input lines 14 are connected to user terminals 20 and the data output lines 16 are connected to various processors 22. Thus the crossbar switch array 10 is used in a computer data processing system to interface the user terminals 20 with the various processors 22. The connection of a user terminal 20 to one or more of the processors 22 is controlled, as described below, by a control computer 24, which is connected to each switching chip 12 by the address lines 13 and the activity lines 19. While a user terminal 20 may be connected to several processors 22, a processor 22 may be connected only to one user terminal 20 at any given time.

A user at a terminal 20 requests connection to a processor 22 by inputting data, for example, signing on, to the terminal. The terminal 20 transmits a data signal representing data, or activity, on the data input line 14 connected to the terminal. The data signal on the data input line 14 is detected by the activity logic 29 connected to the data input line 14, and an any input active switching cell activity line 19a (described below in connection with FIG. 3) is energized. When any one or more of the any input active activity lines 19a is energized, an ACTIVE signal which can operate as an interrupt request is asserted and sent to the control computer 24 over line 25. Thus the control computer 24 will receive a single ACTIVE signal whenever a user on any of the terminals 20 requires a connection through switching array 10 to the processors 22.

In response to the assertion of the ACTIVE signal, the control computer 24 polls the data input lines 14 to find an active line, that is, one carrying a signal, as described in more detail with reference to FIG. 3. Once one active data input line 14 is found, the control computer 24 prompts the user on the terminal 20 attached thereto to input the identity of one or more processors 22 to which he or she requires a connection. When the control computer 24 receives the processor identification information from the terminal 20, it determines if the data output line attached to an identified processor 22 is in use, that is, connected to another user terminal 20 through switching array 10.

The control computer 24 determines the status of the data output line 16 by referring to a status table (not shown) containing the status of each data output line 16. The status table lists each data output line 16 as either available or as in use, that is, connected to a particular data input line 14. If the data output line 16 is in use, the control computer 24 notifies the user, and no connection is made. If the data output line 16 is not in use, that is, if it is available, the control computer 24 transmits address signals identifying the user terminal 20 and the processor 22 to which the user requires a connection to all of the switching chips 12 over the address lines 13. If a user requires a connection to more than one processor 22, the control computer 24 will separately determine the status of each of the data output lines 16 connected to the processors 22 and separately send address signals identifying each of the processors 22 available for connection over the address lines 13.

The address signals on lines 13 are received in parallel in an X decoder 34, a Y decoder 36 and chip select logic 32 in each of the switching chips 12. In response to the address signals, the chip select logic 32 of one switching chip 12 enables the X decoder 34 and Y decoder 36 in the switching chip 12 containing the switching cell 18 which is to provide the connection between the terminal 20 and the identified processor 22. The X decoder 34 and Y decoder 36, as described below in connection with FIG. 2, energize the switching cell 18 to provide the connection. The number of address lines 13 may be reduced by multiplexing the address signals over the same address lines and storing the addresses in either an X register or a Y register depending on the status of an X/Y control signal.

The terminals 20 and the processors 22 are identified by the control computer 24 by address signals comprised of multi-bit row and column address codes. The high order bits of each of the row and column address codes identify, respectively, the row and column location of the switching chip 12 in array 10 containing the appropriate data input line 14 and data output line 16, and the low order bits of the codes identify the row and column location of the appropriate switching cell 18 in the switching chip 12. The high order bits of the X and Y address codes are applied to the chip select logic 32 and compared to a chip location code stored therein. If the code from the control computer 24 matches the chip location code, the chip select logic 32 enables the X decoder 34 an the Y decoder 36 on the switching chip 12.

The enabled X decoder 34, which receives the switching cell 18 row address code, energizes a row enable line 15 for only the row containing the data input line; all other row enable lines 15 on the energized switching chip 12 remain de-energized. The enabled Y decoder 36, which receives the column address code, energizes a column enable line 17 for the appropriate column. The energized column enable line 17, which runs through every switching chip 12 located on the column in the switching array 10, enables the switching cells 18 attached thereto in all of the switching chips 12 to latch the signals on the respective row enable lines 15. These latched signals control the interconnection of the respective data input line 14 and data output line 16. Since only one row enable line 15 is asserted, only one such interconnection is made. Furthermore, any previously established interconnections from a data input line 14 to the data output line 16 are simultaneously terminated.

Once the particular switching cell 18 is energized, the activity logic in all the switching chips 12 associated with the data input line 14 is reset, as described below with reference to FIG. 3, and activity on the data input line 14 no longer causes the activity logic 29 to send an ACTIVE signal to the control computer 24. If this data input line 14 is the only line requiring a connection, the ACTIVE signal will be de-asserted. However, if one or more other data input lines 14 require connections, the ACTIVE signal will remain asserted and the control computer 24 will continue to poll the data input lines 14 and service them until all required connections are made. In this way, the data switch 10 can handle multiple connection requests.

Once a connection is made, the control computer 24 updates the status table by inserting the address code for the data input line 14 into the table entry for the data output line 16 to which the data input line 14 is connected.

After a connection is made through array 10, the activity logic 29 can be used to indicate the state of the data input line 14. If the data input line 14 becomes inactive, the control computer 24 is signaled over an activity line 19c (FIG. 3), as described below. The control computer 24 can then start a timer (not shown) and, if the control computer 24 is not notified by a STILL ACTIVE signal from activity logic 29 over the activity line 19c that the data input line 14 has become active again before the timer times out, the control computer 24 may then list the data output line 16 as available in the status table.

Figure 2:
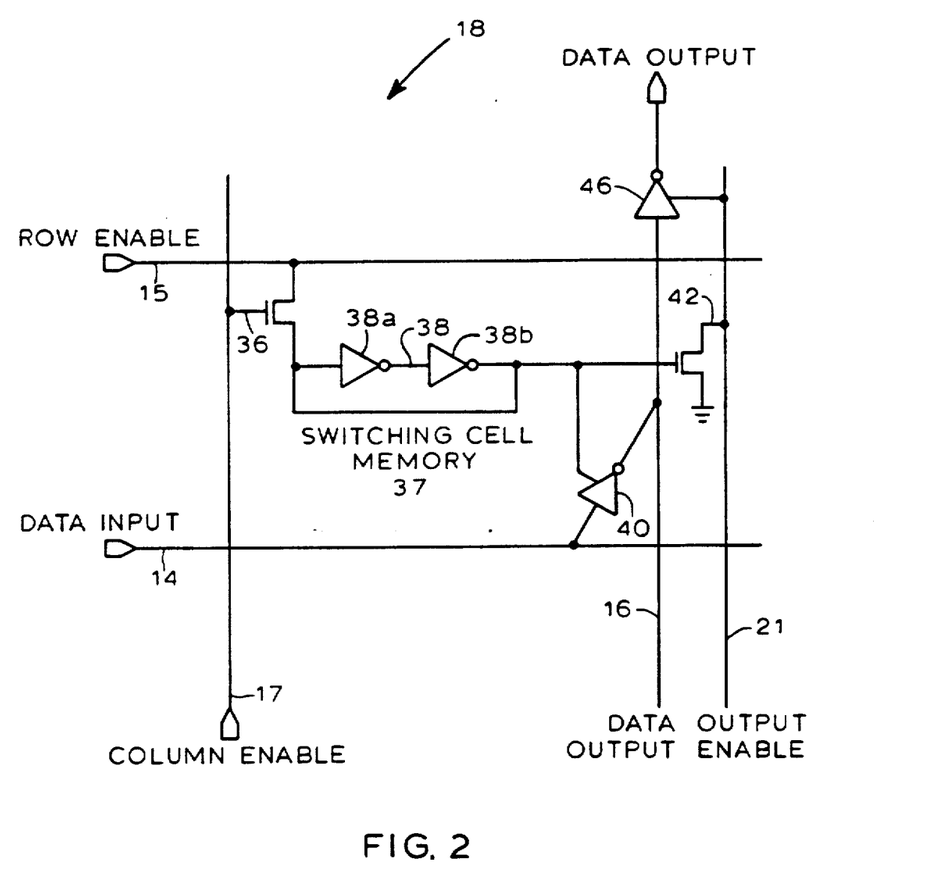
FIG. 2 is a detailed logic diagram of a switching cell used in the switching array depicted in FIG. 1.

FIG. 2 is a detailed schematic diagram of a switching cell 18. With reference to FIG. 2, a switching cell 18 includes a data input line 14 and a row enable line 15 (both depicted horizontally), and a data output line 16, a column enable line 17 and an output enable line 21 (both depicted vertically). Connected between the row enable line 15 and the column enable line 17 is a switching cell memory 37, consisting of a transistor 36 and a latch 38 comprising two inverters 38a and 38b connected in series. The output of the latch 38 controls the gate of a gated inverting driver 40 which can be activated to make the connection between the data input line 14 and the data output line 16. Those skilled in the art will appreciate that pass gates, or other selectively activated relays, can be used in place of the gated inverting driver 40.

The output of latch 38 is also connected to a transistor 42 which, in turn, is connected to an output enable line 21. The output enable line 21 is connected to the gate of a second gated inverting driver 46 which is activated to enable the switching chip output buffers associated with the energized column (not shown) when the switching cell 18 is energized to make a connection. Thus the output buffers associated with the column are only enabled by an energized switching cell 18, and there is no contention among the various switching cells 18 on the same data output line 16 for control of the output buffers.

When the data input line 14 is to be connected to a data output line 16, the row enable line 15 and the column enable line 17 of the cell 18 will be energized by the X decoder 34 and Y decoder 36 (FIG. 1), respectively. More specifically, the Y decoder 36 generates a high signal on column enable line 17, which turns on transistor 36. Since the X decoder 34 is energizing the row enable line 15, the input of latch 38 is high, and so the output of latch 38 is forced high. When the column enable signal on line 17 goes low, the transistor 36 is turned off; however, the high output from latch 38 is fed back to its input, thereby maintaining the condition of the latch. The high output of latch 38 also turns on gated inverting driver 40, enabling it to couple the signal on data input line 14 onto data output line 16. In addition, the high output of latch 38 also turns on transistor 42 enabling gated inverting driver 46, which transmits the signal on line 16 to a data output terminal.

Figure 3:
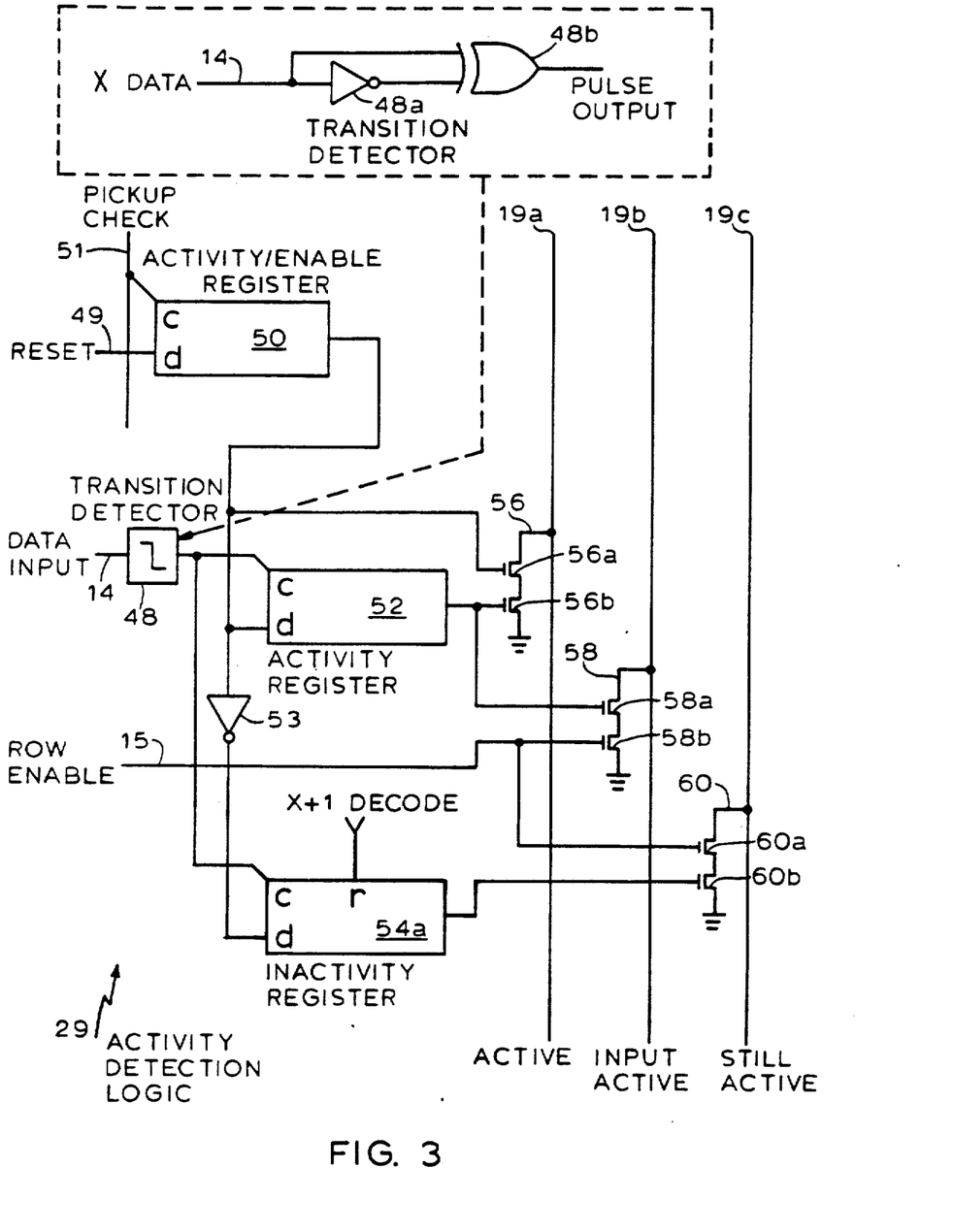
FIG. 3 is a detailed logic diagram of activity logic used in the cell depicted in FIG. 2.

FIG. 3 is a detailed schematic diagram of the activity logic circuit 29. The data input line 14, row enable line 15 and a reset line 49 are depicted horizontally and various activity lines 19a, 19b, 19c, which form the set of activity lines 19 (FIG. 1) associated with the data input line 14, are depicted vertically. The data input line 14 is connected to a transition detector 48, which includes an inverter 48a and an exclusive OR (XOR) gate 48b. The output of the transition detector 48, which consists of negative-going pulses of width corresponding to the signal propagation delay through the inverter 48a when there are data signals on the data input line 14, is applied to clock an activity register 52 and an inactivity register 54, which, with an activity enable register 50, selectively energize the activity lines 19a through 19c through AND gates 56, 58 and 60. The reset line 49, which is associated with each data input line 14, and which is controlled by control computer 24 (FIG. 1) is applied to the activity enable register 50 to reset the register whenever data input line 14 is determined to be inactive, that is, when there are no data signals on the line and the data output line 16 to which the data input line 14 is connected is made available by the control computer 24.

The activity enable register 50 for each data input line 14 in the array 10 is initially set to ONE by the control computer 24 clocking, using pick-up check line 51, an asserted RESET signal, on reset line 49, to the register, thus signifying that the data input line 14 is in an inactive state. Thus transistor 56a, which is connected to the output of the activity enable register 50, is turned on. Transistor 56a forms part of AND gate 56 which is connected to the any input active activity line 19a. The remainder of the AND gate 56 is transistor 56b, which is turned on by the output of an activity register 52 when activity, or data, is present on the data input line 14.

Data on the data input line 14 causes the transition detector 48 to produce transition pulses, as described above. The transition pulses are then applied to clock the activity register 52, causing the high output from activity enable register 50 to be latched into the activity register 54, thereby setting the register. The high output from the set activity register 52 then turns on transistor 56b. When both the transistors 56a and 56b in the AND gate 56 are turned on, the any input active activity line 19a is energized causing the ACTIVE signal to be asserted over line 25 (FIG. 1) to notify the control computer 24 (FIG. 1) that a user terminal 20 has become active.

In response to the assertion of the ACTIVE signal, the control computer polls the data input lines 14 to determine which line or lines are active. As each data input line 14 is polled, the control computer 24 simultaneously energizes the row enable line 15 corresponding to the data input line then being polled by sending the appropriate low order portion of the row address to the X decoders 34, and the high order portion of the row address to chip select logic 32. Thus, when an active data input line 14 is being polled, the corresponding row enable line 15 is energized and a transistor 58b, which forms part of AND gate 58, is turned on. The remainder of AND gate 58, namely transistor 58a, is connected to the activity register 52. The transistor 58a is already turned on by the setting of activity register 52 when data is detected on the data input line 14. Thus, both the transistors 58a and 58b are turned on, and the AND gate 58 energizes a "this input active" switching chip activity line 19b, which enables the assertion of an INPUT ACTIVE signal to notify the control computer 24 that a connection is required, that is, that the data input line 14 is active. The control computer 24 then starts a dialogue with the user terminal 20 connected to the data input line 14, as described above.

After the control computer 24 supervises the connection between an active data input line 14 and the identified data output line 16 through a switching cell 18, as described above, the control computer 24 energizes a pickup check line 51 corresponding to the data input line 14 to latch a ZERO, that is, a de-asserted RESET signal, into the activity enable register 50. The low output of activity enable register 50 is latched into the activity register 52 on the next pulse from transition detector 48. Accordingly, transistors 56a, 56b, 58a and 58b are turned off to de-energize the activity lines 19a (the any input active line) and 19b (the this input active line) and thus any further activity on the data input line 14 will not cause the any input active activity line 19a to be energized. The output of activity enable register 50 is also complemented by an inverter 53 and coupled to the data input of an inactivity register 54. At the next pulse from transition detector 48, the inactivity register 54 is set.

The output of inactivity register 54, which is now high, turns on a transistor 60b, which forms part of AND gate 60. Transistor 60a, which forms the remainder of AND gate 60, is connected to the row enable line 15. Thus when the row enable line 15 is energized and a connection is made, both the transistors 60a and 60b are turned on, and activity line 19c is energized to assert a STILL ACTIVE signal. The STILL ACTIVE signal notifies the control computer 24 that the data input line 14 is active, that is, transferring data.

Activity on the data input line 14 is monitored by the control computer 24 through the use of activity line 19c. The data input line 14 is tested for activity each time the control computer 24 polls the switching cells, for example, in response to an ACTIVE signal. The control computer 24 energizes the row enable line 15 corresponding to the data input line 14 that is being polled. The energized row enable line 15 turns on transistor 60a. If the switching cell 18 is connected and active, the activity register 54 will latch the complemented output of the inactivity register 50, that is, a ONE, and transistor 60b is thus turned on. Then AND gate 60, with both transistors 60a and 60b turned on, will energize activity line 19c and the STILL ACTIVE signal will be asserted.

The control computer 24 continues to systematically poll each data input line 14 in the array 10. After the control computer 24 has polled the data input line 14 in a row of switching cells 18, the control computer 24 advances to the next data input line 14, that is, the next row in switching array 10, and resets the inactivity register 54 connected to the previously polled data input line 14. Thus, if the control computer 24 is polling the third data input line 14 in the switching array 10, the inactivity register 54 connected to the second data input line is reset by reset line 54a. Resetting the inactivity register 54 forces the output low, and transistor 60b is turned off de-energizing activity line 19c, and de-asserting the STILL ACTIVE signal.

When data is next sent over the data input line 14, the complemented output of activity enable register 50 is latched into the inactivity register 54 by the transition pulses from transition detector 48. The now high output of inactivity register 54 then turns on transistor 60b. Thus the next time the switching cell 18 is polled, that is, row enable line 15 is energized, the activity line 19c is again energized and the STILL ACTIVE signal is asserted notifying the control computer 24 that the data input line 14 is still active.

If the data input line 14 has become inactive, the transition detector 48 will not produce any pulses to clock the inactivity register 54. Thus the inactivity register 54 will remain reset and activity line 19c will remain de-energized when the row enable line 15 is energized by the control computer 24, and the associated STILL ACTIVE signal will also remain de-asserted. Thus the control computer 24 can determine if the data input line 14 remains inactive for a prescribed period of time by monitoring the STILL ACTIVE signal and the control computer 24 can then label as available the data output lines 16 to which the inactive data input line 14 is connected.

As described above, the activity logic circuit 29 connected to each data input line 14 monitors activity on the line and informs the control computer 24 when a connection is requested by a user from a terminal 20. The control computer 24 then determines the availability of a data output line 16 which is connected to a user identified processor 22. Once the control computer 24 determines that the data output line 16 is available for a connection, the control computer sends address signals for the terminal 20 and the processor 22 to the switching chips 12. The appropriate switching chip 12 is then enabled, and a connection is made. Thereafter, the activity on the connected data input line 14 is monitored, through the activity logic 29, and the control computer 24 is notified by a de-energized STILL ACTIVE signal when the data input line 14 becomes inactive. After the control computer 24 has been so notified, it monitors the STILL ACTIVE signal to determine if the data output line 16 connected to the data input line 14 should be labeled available. Thus, the switching cell control and monitoring functions are shared between the switching chips 12 and the control computer 24. The control computer 24 is called on by the switching chips 12 to supervise the energizing and the making available of the switching cells 18, and all continuous monitoring of the switching cells 18 and the data lines 14, 16 is done by each chip 12.

The foregoing description is limited to a specific embodiment of this invention. It will be apparent, however, that this invention can be practiced in systems having diverse basic construction or using different internal circuitry than is described in the specification with the attainment of some or all of the advantages of this invention. Therefore, it is the object of the appended claims to cover all such variations as come within the true spirit and scope of this invention.

What is claimed as new and desired to be secured by Letters Patent of the United States is:

1. A digital data processing system comprising:
   A. a plurality of data input means each transmitting data signals over an associated data input line;
   B. a plurality of data utilization means each receiving data signals over an associated data output line;
   C. switching means connected to said data input lines associated with all of said data input means and to said data output lines associated with all of said data utilization means for selectively coupling data signals between said data input lines and said data output lines, said switching means comprising:
      i. a plurality of switching cells each for selectively interconnecting one data input line and one data output line;
      ii. a plurality of activity logic circuits each connected to a data input line to monitor the activity on the data input line, each of said activity logic circuits asserting an active signal when the previously inactive data input line to which it is connected becomes active and requires a connection; and
      iii. control means connected to all of said activity logic circuits and all of said switching cells for:
         a. polling the data input lines in response to one or more of the activity logic circuits asserting an active signal to find an active data input line; and
         b. connecting in the switching cells the active data input lines found by the polling and data output lines while simultaneously disconnecting in the switching cells associated with the data output lines to which connections are made inactive data input lines previously connected to them;
      said control means remaining inactive whenever said activity logic is not asserting an active signal.

2. A digital data processing system as defined in claim 1 in which each of said activity logic circuits includes:
   A. initial activity means connected to a data input line and responsive to a signal on said data input line for indicating initial activity on said data input line;
   B. active indication means connected to said initial activity means and said control means for generating an input active signal in response to the coincidence of said initial activity means indicating initial activity on said data input line and an inquiry from said control means; and
   C. status means connected to said active indication means and said control means for indicating the activity status of said data input line in response to the active indication means having indicated initial activity and a successive inquiry from said control means.

3. A digital data processing system as defined in claim 2 in which said initial activity means includes:
   A. activity-enable register means connected to the control means for storing the status of the associated data input line as previously active or previously inactive; and
   B. transition detection means connected to the activity-enable register means and the data input line for detecting activity on the data input line, such that when said activity-enable register means has the previously inactive status stored in it and activity is detected on the data input line an initial activity signal is asserted.

4. A digital data processing system as defined in claim 2 in which said active indication means includes:
   A. the transition detection means connected to the activity-enable register means and the data input line for detecting initial activity on the data input line; and
   B. inquiry means connected to said control means for inquiring of successive data input lines, such that the coincidence of an inquiry and an initial activity signal indicates that the particular data input line is initially active.

5. A digital data processing system as defined in claim 2 in which said status means includes:
   A. status indicating means connected to the activity-enable register means and the transition detection means for indicating activity on a previously active data input line; and
   B. inquiry means connected to said control means for inquiring of successive data input lines, such that the coincidence of an inquiry and an activity signal from said status indicating means indicates that the data input line continues to be active.

6. A digital data processing system as defined in claim 1 in which said switching cells are arranged in a crossbar pattern of a plurality of rows and a plurality of columns and in which said control means includes:
   A. control computer means connected to said activity logic circuits and all of said data input lines and responsive to an asserted active signal and activity on an unconnected data input line for generating address signals to identify the data input line on which activity is occurring and a data output line to which the identified data input line requires connection; and
   B. decoder means connected to said control computer means and said switching cells for receiving the address signals and for generating enabling signals for enabling the switching cell corresponding to the identified data input line and the identified data output line, said decoder means generating a row enable signal associated with the identified data input line for transmission to all of the switching cells in a row and a column enable signal associated with the identified data output line for transmission to all of the switching cells in a column, said switching cells including connection means, said connection means simultaneously:
      i. interconnecting in a switching cell the respective data input line and data output line in response to the coincidence of a row enable signal and a column enable signal; and
      ii. disconnecting in a switching cell the respective data input line and data output line in response to an energized column enable signal and a de-energized row enable signal.

7. A digital data processing system as defined in claim 6 in which:
   A. said activity logic circuits include:

i. initial activity means connected to a data input line and responsive to a signal on said data input line for indicating initial activity on said data input line;

ii. active indication means connected to said initial activity means and said control means for generating an input active signal in response to the coincidence of said initial activity means indicating initial activity on said data input line and an inquiry from said control means; and B. said control computer includes initial poll means connected to all of said initial activity means and said active indication means for iteratively generating inquiries for transmission to said successive active indication means in response to said initial activity means indicating initial activity on said data input line to determine initial activity over a data input line.

8. A digital data processing system as defined in claim 7 wherein said control computer further includes termination destination request means connected to said initial poll means and all of said data input lines and responsive to said active indication means for identifying a data input line having an initial activity condition, said termination destination request means further including means for interrogating the data input means to identify a data utilization means.

9. A digital data processing system as defined in claim 7 wherein said control computer further includes a data output line status table containing the status of each data output line as either available for connection to any data input line or connected to a particular data input line.

10. A digital data processing system as defined in claim 8 in which each said activity means further includes status means connected to said active indication means and said control means for indicating the activity status of said data input line in response to the active indication means having indicated initial activity and a successive inquiry from said control means, said control computer further including status check means connected to said initial poll means and said status means responsive to said status means indicating inactivity for marking said data output line available in the data output line status table.

11. A switch for use in a digital data processing system including a plurality of data input means each transmitting data signals over a data input line and a plurality of data utilization means each receiving data signals over a data output line, said switch comprising:

A. a plurality of switching cells each for selectively interconnecting one data input line and one data output line;

B. a plurality of activity logic circuits each connected to a data input line to monitor the activity on the data input line, each of said activity logic circuits asserting an active signal line when the data input line to which it is connected becomes active and requires a connection; and C. control means connected to all of said activity logic circuits and all of said switching cells for:

a. polling the data input lines in response to one or more of the activity logic circuits asserting an active signal to find an active data input line; and b. connecting in the switching cells the active data input lines found by the polling and data output lines while simultaneously disconnecting in the switching cells associated with the data output lines to which connections are made inactive data input lines previously connected to them;

said control means remaining inactive whenever said activity logic is not asserting an active signal.

12. A switch as defined in claim 11 in which each of said activity logic circuits includes:

A. initial activity means connected to a data input line and responsive to a signal on said data input line for indicating initial activity on said data input line;

B. active indication means connected to said initial activity means and said control means for generating an input active signal in response to the coincidence of said initial activity means indicating initial activity on said data input line and an inquiry from said control means; and C. status means connected to said active indication means and said control means for indicating the activity status of said data input line in response to the active indication means having indicated initial activity and a successive inquiry from said control means.

13. A switch as defined in claim 12 in which said initial activity means includes:

A. activity-enable register means connected to the control means for storing the status of the associated data input line as previously active or previously inactive; and B. transition detection means connected to the activity-enable register means and the data input line for detecting activity on the data input line, such that when said activity-enable register means has the previously inactive status stored in it and activity is detected on the data input line an initial activity signal is asserted.

14. A switch used in a digital data processing system as defined in claim 12 in which said active indication means includes:

A. the transition detection means connected to the activity-enable register means and the data input line for detecting initial activity on the data input line; and B. inquiry means connected to said control means for inquiring of successive data input lines, such that the coincidence of an inquiry and an initial activity signal indicates that the particular data input line is initially active.

15. A digital data processing system as defined in claim 12 in which said status means includes:

A. status indicating means connected to the activity-enable register means and the transition detection means for indicating activity on a previously active data input line; and B. inquiry means connected to said control means for inquiring of successive data input lines, such that the coincidence of an inquiry and an activity signal from said status indicating means indicates that the data input line continues to be active.

16. A switch as defined in claim 11 in which said switching cells are arranged in a crossbar pattern of a plurality of rows and a plurality of columns and in which said control means includes:

A. control computer means connected to said activity logic circuits and all of said data input lines and responsive to activity on an unconnected data input line for generating address signals to identify the data input line on which the activity is occurring and a data output line to which the identified data input line requires connection; and B. decoder means connected to said control computer means and said switching cells for receiving the address signals and for generating enabling signals for enabling a switching cell corresponding to the identified data input line and the identified data output line, said decoder means generating a row enable signal associated with the identified data input line for transmission to all of the switching cells in a row and a column enable signal associated with the identified data output line for transmission to all of the switching cells in a column, said switching cells including connection means, said connection means simultaneously:
  i. interconnecting in a switching cell the respective data input line and data output line in response to the coincidence of a row enable signal and a column enable signal; and
  ii. disconnecting in a switching cell the respective data input line and data output line in response to an energized column enable signal and a de-energized row enable signal.

17. A digital data processing system as defined in claim 16 in which:
  A. said activity logic circuits include:
    i. initial activity means connected to a data input line and responsive to a signal on said data input line for indicating initial activity on said data input line;
    ii. active indication means connected to said initial activity means and said control means for generating an input active signal in response to the coincidence of said initial activity means indicating initial activity on said data input line and an inquiry from said control means; and
  B. said control computer includes initial poll means connected to all of said initial activity means and said active indication means for iteratively generating inquiries for transmission to said successive active indication means in response to said initial activity means indicating initial activity on said data input line to determine initial activity over a data input line.

18. A digital data processing system as defined in claim 17 wherein said control computer further includes termination destination request means connected to said initial poll means and all of said data input lines and responsive to said active indication means for identifying a data input line having an initial activity condition, said termination destination request means further including means for interrogating the data input means to identify a data utilization means.

19. A digital data processing system as defined in claim 17 wherein said control computer further includes a data output line status table containing the status of each data output line as either available for connection to any data input line or connected to a particular data input line.

20. A digital data processing system as defined in claim 18 in which each said activity means further includes status means connected to said active indication means and said control means for indicating the activity status of said data input line in response to the active indication means having indicated initial activity and a successive inquiry from said control means, said control computer further including status check means connected to said initial poll means and said status means responsive to said status means indicating inactivity for marking said data output line available in the data output line status table.

21. A switch containing a plurality of data input lines connected to data transmitting means, a plurality of data output lines connected to data utilization means, switching means for selectively coupling data signals between the data input lines and data output lines, and control means for controlling such couplings, said switching means comprising:
  A. a plurality of switching cells each for selectively interconnecting one data input line and one data output line said switching cells being arranged in a crossbar pattern of a plurality of rows and a plurality of columns;
  B. a plurality of activity logic circuits each connected to a data input line and to the control means to monitor the activity on the data input line and assert an activity signal when an inactive data input line becomes active and requires a connection; and
  C. decoder means connected to the control means and said switching cells for receiving address signals from the control means in response to one or more of said activity logic circuits asserting an active signal and signals from the data input means over an active, unconnected data input line indicating the destination of data transmitted over the data input line, said decoder means generating a row enable signal associated with the data input line for transmission to all of the switching cells in a row and a column enable signal associated with a data output line corresponding to the data destination for transmission to all of the switching cells in a column, said switching cells including connection means, said connection means simultaneously:
    i. interconnecting in a switching cell the respective data input line and data output line in response to the coincidence of a row enable signal and a column enable signal; and
    ii. disconnecting in a switching cell the respective data input line and data output line in response to an energized column enable signal and a de-energized row enable signal.

22. A switch as defined in claim 21 in which said activity logic circuits include:
  A. initial activity means connected to a data input line and responsive to a signal on said data input line for indicating initial activity on said data input line;
  B. active indication means connected to said initial activity means and said control means for generating an input active signal in response to the coincidence of said initial activity means indicating initial activity on said data input line and an inquiry from said control means; and
  C. status means connected to said active indication means and said control means for indicating the activity status of said data input line in response to the active indication means having indicated initial activity and a successive inquiry from said control means.

23. A switch as defined in claim 22 in which said initial activity means includes:
  A. activity-enable register means connected to the control means for storing the status of the associated data input line as previously active or previously inactive; and
  B. transition detection means connected to the activity-enable register means and the data input line for detecting activity on the data input line, such that when said activity-enable register means has the previously inactive status stored in it and activity is detected on the data input line an initial activity signal is asserted.

24. A switch as defined in claim 22 in which said active indication means includes:
   A. the transition detection means connected to the activity-enable register means and the data input line for detecting initial activity on the data input line; and
   B. inquiry means connected to said control inquiring of successive data input lines, such that the coincidence of an inquiry and an initial activity signal 25. A switch as defined in claim 22 in which said status means includes:
   A. status indicating means connected to the activity-enable register means and the transition detection means for indicating activity on a previously active data input line; and
   B. inquiry means connected to said control means for inquiring of successive data input lines, such that the coincidence of an inquiry and an activity signal from said status indicating means indicates that the data input line continues to be active.

26. A switch for use in a digital data processing system including a plurality of data input means each transmitting data signals over a data input line, a plurality of data utilization means each receiving data signals over a data output line, switching means which includes a plurality of switching cells each for selectively interconnecting one data input line and one data output line, control means connected to all of the switching cells and to a plurality of activity logic circuits each connected to a data input line to monitor activity on a data input line and indicate such activity to the control means, said activity logic circuits comprising:
   A. initial activity means connected to a data input line and the control means and responsive to a signal on said data input line for indicating initial activity on said data input line;
   B. active indication means connected to said initial activity means and said control means for generating an input active signal in response to the coincidence of said initial activity means indicating initial activity on said data input line and an inquiry from said control means; and
   C. status means connected to said active indication means and said control means for indicating the activity status of said data input line in response to the active indication means having indicated initial activity and a successive inquiry from said control means.

27. A switch as defined in claim 26 in which said initial activity means includes:
   A. activity-enable register means connected to the control means for storing the status of the associated data input line as previously active or previously inactive; and
   B. transition detection means connected to the activity-enable register means and the data input line for detecting activity on the data input line, such that when said activity-enable register means has the previously inactive status stored in it and activity is detected on the data input line an initial activity signal is asserted.

28. A switch as defined in claim 26 in which said active indication means includes:
   A. the transition detection means connected to the activity-enable register means and the data input line for detecting initial activity on the data input line; and
   B. inquiry means connected to said control means for inquiring of successive data input lines, such that the coincidence of an inquiry and an initial activity signal. indicates that the particular data input line is initially active.

29. A switch as defined in claim 26 in which said status means includes:
   A. status indicating means connected to the activity-enable register means and the transition detection means for indicating activity on a previously active data input line; and
   B. inquiry means connected to said control means for inquiring of successive data input lines, such that the coincidence of an inquiry and an activity signal from said status indicating means indicates that the data input line continues to be active.

30. A digital data processing system comprising:
   A. a plurality of data input means each transmitting data signals over an associated data input line;
   B. a plurality of data utilization means each receiving data signals over an associated data output line;
   C. switching means connected to said data input lines associated with all of said data input means and to said data output lines associated with all of said data utilization means for selectively coupling data signals between said data input lines and said data output lines, said switching means comprising:
      i. a plurality of switching cells each for selectively interconnecting one data input line and one data output line;
      ii. a plurality of activity logic circuits each connected to a data input line to monitor the activity on the data input line, said activity logic circuits including:
         a. initial activity means connected to a data input line and responsive to a signal on said data input line for indicating initial activity on said data input line;
         b. active indication means connected to said initial activity means and said switching means for generating an input active signal in response to the coincidence of said initial activity means indicating initial activity on said data input line and an inquiry from said control means; and
      iii. control means connected to all of said activity logic circuits and all of said switching cells for connecting in the switching cells active data input lines to data output lines in response to the activity monitored by said activity logic circuits, said control means including:
         a. control computer means connected to said activity logic circuits and all of said data input lines and responsive to initial activity on a data input line, said control computer means including:
            1. initial poll means connected to all of said initial activity means and said active indication means for iteratively generating inquiries for transmission to successive active indication means in response to said initial activity means indicating initial activity on said data input line to determine initial activity over a data input line, 2. termination destination request means connected to said initial poll means and all of said data input lines and responsive to said active indication means for identifying a data input line having an initial activity condition, said termination destination request means further including means for interrogating the data input means to identify a data utilization means, and 3. means for generating address signals corresponding to the data input line having an initial activity condition and the data output line connected to the identified data utilization means; and B. decoder means connected to said control computer means and said switching cells for receiving the address signals and for generating enabling signals for enabling the switching cell associated with the data input line and the data output line for which address signals are generated by energizing a row enable signal associated with the data input line and a column enable signal associated with the data output line, respectively, said enabled switching cell providing a connection between the data input line and the data output line, and said energized column enable signal further acting to disconnect from the data output line any data input lines associated with de-energized row enable signals.

31. A digital data processing system as defined in claim 30 wherein said control computer further includes a data output line status table containing the status of each data output line as either available for connection to any data input line or connected to a particular data input line.

32. A digital data processing system as defined in claim 30 in which each said activity means further includes status means connected to said active indication means and said control means for indicating the activity status of said data input line in response to the active indication means having indicated initial activity and a successive inquiry from said control means, said control computer further including status check means connected to said initial poll means and said status means responsive to said status means indicating inactivity for marking said data output line available in the data output line status table.

33. A crossbar switch for a digital processing system, said switch including:

A. an array of switching cells, each of which includes:
   i. a data input line,
   ii. a row enable line,
   iii. a data output line,
   iv. a column enable line, and
   v. connection means responsive to the row enable line and the column enable line for:
      a. connecting the data input line and the data output line when the row enable line and the column enable line of the switching cell are both energized, said connection means maintaining a connection when the column enable line and the row enable line are thereafter de-energized, and
      b. disconnecting the data input line from the data output line when the column enable line is energized and the row enable line is not energized;

B. row enabling means for energizing the row enable line associated with a data input line requiring connection; and C. column enabling means for energizing a column enable line associated with a data output line to which the data input line associated with the energized row enable line requires connection, said column enabling means, by energizing a column enable line, simultaneously enables the connection means of each switching cell in the column to:
   i. disconnect from the associated data output line a data input line which corresponds to a de-energized row enable line, and
   ii. connect to the associated data output line the data input line which corresponds to the energized row enable line.

34. The switch of claim 33, wherein the row enabling means energizes at most one row enable line at any given time.

35. The switch of claim 34, wherein said connection means includes storage means for storing the current state of the switching cell.

36. A method for operating a crossbar switch, said method including:

A. energizing a row enable line corresponding to a data input line requiring connection to a data output line;

B. energizing a column enable line corresponding to the data output line to which the data input line associated with the energized row enable line requires connection, said energized column enable line simultaneously:
   i. disconnecting from the associated data output line any data input line which corresponds to a de-energized row enable line, and
   ii. connecting to the data output line the data input line which corresponds to the energized row enable line; and C. de-energizing the column enable line and the row enable line once a connection is made.

37. The method of operating a switch of claim 36, wherein said method further includes storing within a switching cell the current state of the cell.

* * * * *